(12) United States Patent
Bassett

(10) Patent No.: US 7,815,807 B2
(45) Date of Patent: Oct. 19, 2010

(54) SURFACTANT-BASED WATER TREATMENT FOR IRRIGATED SOILS

(76) Inventor: Brian D. Bassett, 3999 Chestnut Diagonal, Suite 2-245, Fresno, CA (US) 93726

( * ) Notice: Subject to any disclaimer, the term of this patent is extended or adjusted under 35 U.S.C. 154(b) by 1033 days.

(21) Appl. No.: 11/475,589

(22) Filed: Jun. 26, 2006

(65) Prior Publication Data

US 2007/0295670 A1  Dec. 27, 2007

(51) Int. Cl.
B01D 21/01 (2006.01)
(52) U.S. Cl. .................................................. 210/734
(58) Field of Classification Search ........................ None
See application file for complete search history.

(56) References Cited

U.S. PATENT DOCUMENTS

| 5,958,104 | A  | * | 9/1999 | Nonomura et al. | ............. | 71/11 |
| 6,851,219 | B2 |   | 2/2005 | Kostka et al. | | |
| 7,323,188 | B2 | * | 1/2008 | Matsuo et al. | ............. | 424/406 |
| 2002/0174697 | A1 | * | 11/2002 | Reid et al. | ...................... | 71/23 |

FOREIGN PATENT DOCUMENTS

WO  WO01/08483 A1  2/2001

OTHER PUBLICATIONS

Kostka et al.,"Advances in Understanding and Managing Water Repellent Soils", Aguatrols.com/ResearchInfo/Technical Papers/Repellent Soils.htm (2005).

Haman et al., "Chemical Injection Methods for Irrigation", University of Florida, IFAS Extension (2005).
IrrigAid Product Brochure, Agricultural Soil Surfactant, SipCAM AGRO USA (2005).
Pelishek, R.E., Soil Sci. Soc. Am. Proc. 26:595-598 (1962).
Feng, G.L., et al., The Influence of Two Surfactants on Infiltration into a Water-Repellent Soil, Soil Sci Soc Am J, 2002, 66, 361-367.
Kostka, S.J., et al., Advances in Understanding and Managing Water Repellent Soils, [online] [retrieved on May 24, 2010], URL: https://s3.amazonaws.com/aquatrols/2009111690637.pdf.
Lentz, R.D., Inhibiting Water Filtration With Polyacrylamide and Surfactants: Applications for Irrigated Agriculture, Journal of Soil and Water Conservation, 2003, 58(5), 290-300.
Walworth, J., et al, Aquatrols Surfactant Study on Turfgrass Nutrient Uptake, [online] [retrieved on May 24, 2010] URL: http://ag.arizona.edu/pubs/crops/az1359/az13593c5.pdf.
Penmax, Western Nutrient Product Brochure, 2005 [online] [retrieved Nov. 12, 2005] URL: www.westernnutrientscorp.com/penmax.html.

* cited by examiner

*Primary Examiner*—Shanon A Foley
(74) *Attorney, Agent, or Firm*—Syndicated Law PC; Brian S. Boyer

(57) ABSTRACT

The disclosure is directed to methods of making and using a water treatment composition for improved water infiltration during irrigation of agriculture. These methods include combining additives with an aqueous fluid to create a treated irrigation water, wherein the additives comprise a preselected amount of a surfactant and a preselected amount of a displacement ion. The improved infiltration is obtained through a constant, or substantially constant, application of the treated irrigation water to the soil during the irrigation.

17 Claims, 4 Drawing Sheets

SURFACTANT-BASED WATER TREATMENT FOR IRRIGATED SOILS

BACKGROUND

1. Field of the Invention

This invention is directed to methods of making and using a water treatment composition for improved water infiltration during irrigation.

2. Description of the State of the Art

Maintaining the quality of soil and turf, as well as optimizing irrigation through the conservation of water, are goals of agriculturists and turfgrass managers, especially under drought conditions. These goals can be better approached through an implementation of a variety of approaches that include increasing water infiltration, decreasing water run-off and evaporation, as well as managing the storage and availability of the water that has reached the rootzone. However, these approaches can be difficult to implement for a number of reasons. In semi-arid regions, for example, there is an inefficient water supply to support stable agriculture—both in stored water supplies and in natural aquifers. Furthermore, the seasonal rainfall in such regions can be insufficient and highly erratic from year to year.

A critical factor in obtaining a sufficient water supply in a soil is the degree to which the soil surface allows water to penetrate, and this can become critical at the time of the first irrigation. The surface of the soil changes with the formation of soil peds or aggregates. These peds or aggregates are formed by both physical forces that include binding of the soil components, which occurs principally through the interactions of organic matter and microbials in the soil. The net result is a formation of a surface crust that can often be nearly impervious to water, can severely decrease water infiltration (often by a thousand-fold or more), increase water run-off and evaporation and, thus, make it difficult for one of skill to manage the storage and availability of water at the rootzone.

The wetting profiles of a crusted soil are non-uniform with and often show an increase in leaching due to preferential flow of water. It should also be appreciated that dire environmental consequences can also result from the crusting of soil under irrigation conditions, including a surface run-off of pesticides and fertilizers into pristine areas and/or potable reservoirs.

Chemicals, such as gypsum, sulfuric acid or sulfur, to control the impact of problems associated with poor irrigation. Unfortunately, not only is there a cost to obtain and use such chemicals, there are additional costs that include a need for extra storage facilities and an increased freight capacity. For example, agriculturalists will often apply various surfactant compositions in the management of the water repellency of thatch and soils, as well as for the enhancement of soil hydration in managed turfgrass. One of skill will appreciate, however, that although soil surfactants perform well, they are often cost-prohibitive in many applications, since the amount of soil surfactant that must be applied to reduce the surface tension of a soil and obtain the desired water penetration is high.

At least for the reasons described above, the skilled artisan will appreciate the novel methods and compositions taught in this application for irrigating soil. The present invention is superior to anything currently available in the art with respect to the results that are realized at a given cost of operation.

SUMMARY OF THE INVENTION

Embodiments of the present invention generally encompass methods of making and using a water treatment composition for improved water infiltration during irrigation of agriculture.

In some embodiments, the invention includes a method of irrigating soil comprising combining additives with an aqueous fluid to create a treated irrigation water. The additives comprise a preselected amount of a non-ionic surfactant and a preselected amount of a displacement ion. The treated irrigation water is applied to a soil for an improved penetration of water into the soil during the irrigation, wherein the improved penetration is obtained through a constant, or substantially constant, application of the treated irrigation water to the soil during the irrigation.

In some embodiments, the method includes producing a water treatment composition that comprises the non-ionic surfactant and the displacement ion. The water treatment composition is added to the aqueous fluid in an amount sufficient for the improved penetration of water into the soil during the irrigation.

In some embodiments, the invention includes a water treatment composition for irrigating soil comprising a preselected amount of a non-ionic surfactant and a preselected amount of a displacement ion. In these embodiments, the displacement ion can be selected from a group consisting of calcium, potassium, phosphate, and combinations thereof. In some embodiments, the water treatment composition comprises fulvic acid.

In some embodiments, the invention includes a system for delivering a treated irrigation water to a soil using the method of irrigating soil described herein, wherein the system comprises a storage component that holds a water treatment composition, wherein the water treatment composition comprises from about 1% to about 20% of a non-ionic surfactant; and from about 0.2% to about 10% of a displacement ion; a feeding component that feeds the water treatment composition to an aqueous fluid to create a treated irrigation water, wherein the feeding component is capable of feeding the water treatment composition to an aqueous fluid produce a concentration ranging from about 1 ppm to about 30 ppm; and a delivery component that applies the treated irrigation water to a soil.

In some embodiments, the invention includes a method of improving the quality and shelf-life of an agricultural product, wherein the method comprises using the method of irrigating soil taught herein, the water treatment compositions taught herein, or the systems taught herein.

DETAILED DESCRIPTION OF THE EMBODIMENTS

As discussed in more detail below, the embodiments of the present invention generally encompass methods of making and using a water treatment composition for improved water infiltration during irrigation of a soil, wherein the improved water infiltration is obtained through a constant, or substantially constant, application of a treated irrigation water to the soil during the irrigation. The term water infiltration refers to the penetration of an aqueous composition of the present invention into a soil during irrigation.

An application of the treated irrigation water to a soil is considered to be within the scope of a "substantially constant" application, when the performance of the treated irrigation water is not significantly compromised. For example, brief interludes during the application may occur in some embodiments where an aqueous fluid other than the treated irrigation water is applied, as a consequence of process limitations or otherwise, as long as the process is designed such that the treated irrigation water is to be applied through the entire irrigation cycle and any brief interludes in the application do not significantly affect soil penetration. The teaching provided below is directed to making and using these novel water treatment compositions.

Figure 1:
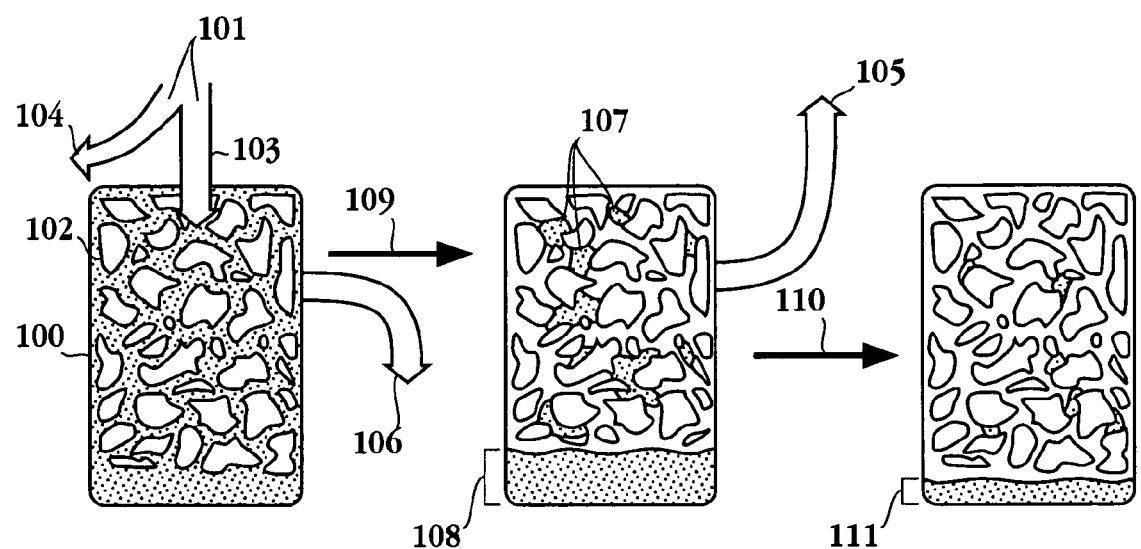
FIG. 1 illustrates various inter-relationships between a soil sample and water that can be present during irrigation according to some embodiments of the present invention.

FIG. 1 illustrates various inter-relationships between a soil sample and water that can be present during irrigation according to some embodiments of the present invention. A cross-section of a soil sample 100 is depicted in FIG. 1. As water 101 is applied to the soil 102, the water 101 can penetrate into the soil, which is also known as water infiltration 103. With a higher water infiltration 103, more water will be available to plants and less run-off water 104 will be created at the surface of the soil 102. Run-off water 104 can erode the soil 102 and wash away nutrients that the plants need to survive and thrive.

The application of water can also result in run-off 104 as opposed to, or in addition to, the desired infiltration 103. The water is subject to evaporation and transpiration 105 from the soil 102, as well as drainage 106 due to gravity, and the water 101 is held in the soil 102 through adhesion and cohesion 107. A water table 108 forms at the field capacity of the water 101, wherein the water table 108 is the depth at which the soil 102 is always saturated, and the field capacity is the amount of water 101 in the soil 102 at which about one-half of the pores in the soil 102 are filled.

The field capacity of a soil 102 is the maximum amount of water 101 that the soil 102 can hold against the pull of gravity. The water table 108 can form, and the field capacity can be obtained, in a few days 109. However, a few weeks of drought 110 can resulting in the soil 102 reaching its wilting point 111, which is the point at which plants can no longer extract the remaining water 101.

The amount of water 101 that can be retained by the soil 102 under a given set of environmental conditions depends not only on the type of soil 102, but also on how the soil 102 is managed. Water infiltration 103 can be a significant problem and is found worldwide in diverse soils, crops, and cropping systems. The physical structure of the soil 102, for example, can have a profound effect on the amount of water 101 retained by the soil 102.

One mechanism of water retention is surface tension, such that a soil 102 having small pores can often hold more water 101 than a soil 102 having relatively larger pores. Fine-textured soils, such as silt and clay loams, have smaller pores that provide a higher capillary pressure that can retain more water than the lower capillary pressure provided by relatively large pores, for example, the larger pores that are often present in sandy soils. The composition of the soil 102 also has an effect, where larger amounts of organic matter results in a soil 102 that holds more water 101.

Moreover, as soils dry, the adhesion and cohesion 107 of the water 101 can create a crust on the soil and result in a decreased infiltration of the water 101, whether from irrigation or precipitation. In addition, crusting can also result in non-uniform wetting profiles of the soil 101, increased run-off and evaporation of the water 102, and increased leaching of the water 102.

Figure 2:
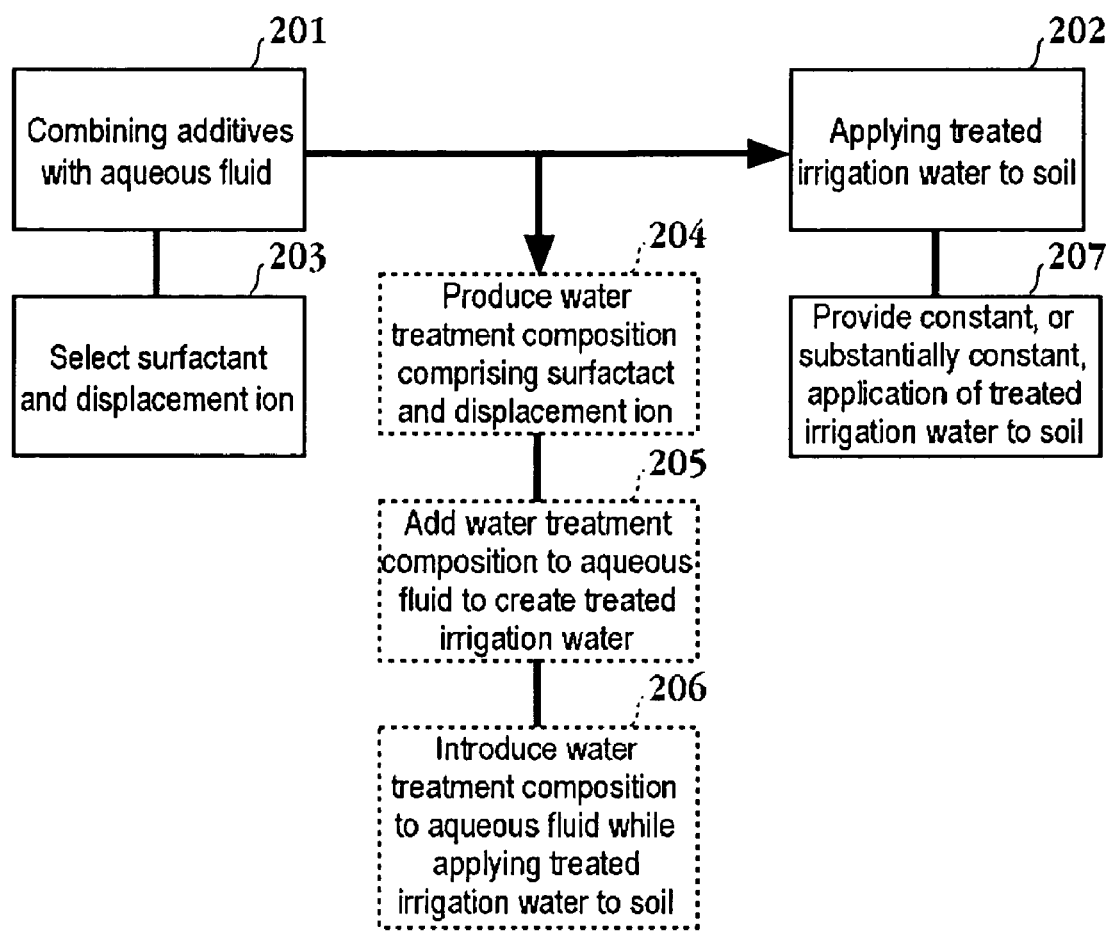
FIG. 2 illustrates a method of irrigating soil according to some embodiments of the present invention.

FIG. 2 illustrates a method of irrigating soil according to some embodiments of the present invention. The method includes combining 201 additives with an aqueous fluid to create a treated irrigation water, wherein the additives comprise a preselected amount of a surfactant and a preselected amount of a displacement ion. The treated irrigation water is then applied 202 to the soil for an improved penetration of water into the soil during the irrigation. The improved penetration is obtained by this method through a constant, or substantially constant, application of the treated irrigation water to the soil during the irrigation.

The method includes selecting 203 the surfactant and the displacement ion. In some embodiments, the surfactant is a composition comprising a non-ionic surfactant.

Many surfactants are suitable for use in the present invention. Examples of commercially available surfactants include, but are not limited to, TWEEN 20, TWEEN 40, TWEEN 60, TWEEN 80, TWEEN 21, SPAN, INCROCAS 30, INCROCAS 35, INCROCAS 40, ACCONON C-10, ACCONON CA-15, ACCONON CA-9, ACCONON CC-6, CROVAL A-40, CROVAL A-70, GELUCIRE 44/14, GELUCIRE 50/13, LABRASOL, SOLUTOL HS15, VOLPO 10, VOLPO 20, PLURONIC F108, PLURONIC F127, PLURONIC F68, PLURONIC F87, PLURONIC L44, PLURONIC R 17R4, TETRONIC 304, and combinations thereof.

Other examples of surfactants that can be used in the present invention include, but are not limited to, polyoxyl 40 stearate, polyoxyl 50 stearate, triblock co-polymers of ethylene oxide/propylene oxide/ethylene oxide, sorbitan monopalmitate, sorbitan monostearate, glycerol monostearate, polyoxyethylene stearate, polyoxyethylene 40 sorbitol lanolin derivative, polyoxyethylene 75 sorbitol lanolin derivative, polyoxyethylene 6 sorbitol beeswax derivative, polyoxyethylene 20 sorbitol beeswax derivative, polyoxyethylene 20 sorbitol lanolin derivative, polyoxyethylene 50 sorbitol lanolin derivative, polyoxyethylene 23 lauryl ether, polyoxyethylene 23 lauryl ether, polyoxyethylene 2 cetyl ether, polyoxyethylene 10 cetyl ether, polyoxyethylene 20 cetyl ether, polyoxyethylene 2 stearyl ether, polyoxyethylene 10 stearyl ether, polyoxyethylene 20 stearyl ether, polyoxyethylene 21 stearyl ether, polyoxyethylene 20 oleyl ether, polyoxyethylene 40 stearate, polyoxyethylene 50 stearate, polyoxyethylene 100 stearate, sorbitan monopalmitate, sorbitan monostearate, sorbitan tristearate, polyoxyethylene 4 sorbitan monostearate, polyoxyethylene 20 sorbitan tristearate, and mixtures thereof.

In some embodiments, the non-ionic surfactant can include an alkyl phenol ethoxylate, such as octylphenoxy polyethoxyethanol. An example of such a non-ionic surfactant is OP-10, which is available from the Huntsman Corporation of Houston, Tex.

In some embodiments, the surfactant can include a mixture of poly(ethylene glycol) octylphenyl ether, poly(ethylene glycol), dioxane, and ethylene oxide. An example of such a mixture is TRITON X-100, which is available from Mallinckrodt Baker, Inc. of Phillipsburg, N.J.

In some embodiments, the surfactant is a combination of surfactants, where in the combination is at least substantially non-ionic. An example of such a combination is a mixture of TRITON X-100 and OP-10.

The surfactants that can be used in the present invention include ionic and non-ionic surfactants. In many embodiments, the surfactant comprises a non-ionic surfactant. The non-ionic surfactant should not alter electrical conductivity of the water in which it has been dissolved, and the electrical conductivity should remain unaltered even with changes in the pH of the soil. The surfactant should also have a very low volatility and migrate evenly through the soil.

In some embodiments, the non-ionic surfactants can be combined with an ionic surfactant. The ionic surfactant usually contains the salt of an organic acid, either carboxylic, or sulfonic. These are usually sodium salts and can interact with hard water calcium, magnesium ions form a low solubility scum that may restrict water movement in the soil, particularly basic soils. It should be appreciated that, in some embodiments, only a non-ionic surfactant may be used. Examples of non-ionic surfactants include, but are not limited to, TRITON X-100 and OP-10.

Examples of other surfactants that may also be used in the present invention include, but are not limited to, alcohol ethoxylates, linear primary alcohol ethoxylates, primary aliphatic oxyalkylated alcohols, nonyl phenol ethoxylate, primary alkyl poly(oxyethylene ether), alkyl polyglycosides, poly(ethylene oxide-co-propylene oxide), or combinations or copolymers thereof. Examples of such a copolymer can include a triblock copolymer of ethylene oxide-propylene oxide-ethylene oxide having an average molecular weight ranging from about 2000 to about 8000. The alkyl constituents of the surfactants can have from about 1 to about 20 carbons and can be linear or branched.

Alkyl polyglycosides are reaction products of sugars and fatty alcohols. Suitable sugars are aldoses and ketoses such as glucose, fructose, mannose, galactose, talose, gulose, allose, altrose, idose, arabinose, xylose, lyxose, lactose, sucrose, maltose, maltotriose, cellobiose, mellobiase, and ribose, which can be referred to as glycoses. The term "alkyl" in the alkyl polyglycosides is intended to encompass the residue of an aliphatic alcohol, preferably a fatty alcohol, obtainable from natural fats, whether saturated or unsaturated, or mixtures thereof.

The terms alkyl oligoglycoside, alkyl polyglycoside, alkyl oligosaccharide and alkyl polysaccharide apply to alkylated glycoses of the type in which one alkyl radical in the form of the acetal is attached to more than one glycose residue, such as to a polysaccharide or oligosaccharide residue. The term alkyl polyglycoside is further intended to encompass both alkyl monoglycosides, alkyl poly(oligo)glycosides, and combinations thereof.

Alkyl polyglycosides and block copolymers of ethylene oxide and propylene oxide can be used in combination. In some embodiments, the ratio of alkyl polyglycoside to the block copolymer can range from about 6:1 to about 0.5:1. In some embodiments, the ratio of alkyl polyglycoside to the block copolymer ranges from about 4:1 to about 0.7:1.

In some embodiments, the surfactants are present in the treated irrigation water in an amount that ranges from about 0.00005% to about 0.06%, 0.0001% to about 0.04%, from about 0.0003% to about 0.02% from about 0.0005% to about 0.01%, from about 0.0007% to about 0.007%, from about 0.001% to about 0.005%, or any range therein, by weight. In some embodiments, the surfactants are present in the water treatment composition in an amount that ranges from about 1% to about 20%, from about 0.5% to about 25%, from about 1.5% to about 15%, from about 2% to about 12%, from about 3% to about 10%, or any range therein, by weight. It is to be appreciated that the amount of surfactant present can be above or below these ranges, depending on the nature of the surfactant and the conditions under which the irrigation occurs.

The additives can be combined with the aqueous fluid directly, or the additive can be combined first to produce 204 a water treatment composition. The water treatment composition can be added 205 to the aqueous fluid in any manner to create a treated irrigation water. For example, in some embodiments, the method can include introducing 206 the water treatment composition to the aqueous fluid while applying the treated irrigation water to a soil. In some embodiments, the water treatment composition can include preparing a batch of treated irrigation water and irrigating the soil using the batch preparation. In most embodiments, however, the method includes providing 207 a constant, or substantially constant, application of a treated irrigation water to the soil.

The term "displacement ion" is used herein because the ion is thought to displace the sodium ions that are present in the soil in order to inhibit soil crusting that would otherwise occur without introduction of the displacement ion into the soil. The term is used for convenience and the present invention should not be limited to the presence of such a postulated mechanism of action.

Without intending to be bound by any theory or mechanism of action, soils containing sodium salts can have decreased rates of water infiltration due to the dispersion of clay particles within the soil. The soil dispersion may be caused by the large hydrated radius of sodium, as compared to calcium, magnesium, and potassium. This large hydrated radius of sodium forces clay particles apart, creates a dispersion in the soil, and dispersed clay particles can be transported into pore spaces that were previously available for the infiltration of water into the soil. Once the soil pores are filled with the dispersed clay particles, soil surface drying can result in a crusting problem that can inhibit seedling emergence and growth. This problem can be magnified by applying additional water, particularly if the water has a high sodium content—the additional water can result in leaching, which can remove the calcium and magnesium from the soil and leave a relatively high proportion of sodium.

One of skill will recognize that a variety of displacement ions may be useful in the present invention. In some embodiments, the displacement ion can include, but is not limited to, calcium, magnesium, potassium, phosphates, and combinations thereof. In these embodiments, the calcium, phosphorous, and potassium, for example, can provide the soil with nutritional value.

In some embodiments, the displacement ion can be added to the water treatment composition in an amount that ranges from about 0.2% to about 10%, from about 0.2% to about 7.5%, from about 0.2% to about 5%, from about 0.2% to about 3% from about 0.2% to about 2%, from about 0.4% to about 4%, from about 0.5% to about 2%, from about 0.75% to about 2%, or any range therein, in weight percent.

In some embodiments, the displacement ion is added to the irrigation water in an amount that ranges from about from about 0.00002% to about 0.03%, from about 0.00005% to about 0.01%, from about 0.0001% to about 0.0005%, or any range therein, by weight. The displacement ion actually present in the treated irrigation water also includes the amount of the displacement ion that was present in the aqueous fluid before the combining.

In many embodiments, calcium is a component of the water treatment compositions. Calcium is required for normal plant growth and development and is needed for proper cell wall and cell membrane development. The calcium in CAN 17, for example, is water soluble and readily available to plants to provide good early-season cell wall development and avoid bad late-season internal disorders. CAN 17 is a versatile fertilizer that contains 8.8% calcium and 17% nitrogen, and is available from Unocal Agriproducts of Brea, Calif. The nitrogen is one-third an ammonic form and two-thirds a nitrate form. CAN 17 offers the advantages of having both an available and a reserve form of nitrogen in addition to soluble calcium. It has the highest percentage of nitrate nitrogen which is available immediately to plants and makes it an excellent early-season fertilizer for crops as they grow in cool soils, while the ammonic form is held in reserve until soil temperatures rise and a plant's nitrogen requirements are greater. The ammonic form must be converted by soil bacteria into the nitrate which is slow at soil temperatures below 45° F. and fast above 70° F.

One of skill will appreciate that other products similar to CAN 17 are available and can be used in some embodiments of the present invention. A product known as CN 9, a calcium nitrate solution having 9% nitrogen and 11% calcium, for example, can also be used either alone or in combination with a product such as CAN 17. A product known as ESCA-LEIGHT, available from Helena Chemical Co., Fresno, Calif., provides for a rapid calcium availability for calcium deficient crops and is derived from calcium nitrate, calcium hydroxide, and hydroxytricarboxylic salts. ESCALEIGHT contains 5% nitrogen, 8% calcium, and 4% hydroxytricarboxylic salts.

In some embodiments, phosphorus fertilization is desired, because phosphorus is removed from the soil primarily by plant uptake or soil erosion. Inorganic phosphorus is immobile in the soil system, so it does not leach. By comparison, organic phosphorus has greater mobility in soils. Polyphosphates move farther than other commonly used products; however, when compared to nitrates and sulfates, polyphosphate movement is extremely limited.

In some embodiments, nitrogen/phosphorous combinations can be used in the present invention. For example, a nitrogen/phosphorous combination is 11-52-0 which is a mono-ammonium phosphate that is available from J.R. Simplot Co. of Boise, Id. In some embodiments, the addition of nitrogen-containing compounds such, for example, ammonium-based compounds, is undesirable, particularly where that compound is a primary ingredient.

In some embodiments, the additives can further comprise fulvic acid, humic acid, ulmic acid, or combinations thereof, to replace a soil's humus. Humus is the dark brown substance formed after soil microorganisms have decomposed plant remains and is the substance that is responsible for soil fertility and the production of healthy plants free of insects and disease. One of skill will appreciate that at least 50 percent of a soil's humus is often lost after the first three years of cultivation, and that the high cation exchange capacity of humus serves to chelate plant food elements and release them as the plant requires. The chelation process holds the nutrients in the soil solution and prevents their leaching and runoff and increases the humus content in the soil for better tilth, water and nutrient retention, and soil aeration. Sources of such additives include Leonerdite or liquid compost. It should be appreciated that in some embodiments, humic acids are undesirable in the compositions of the present invention, as humic acids can assist in the formation of soil crusts.

Without intending to be bound by any theory or mechanism of action, one of skill will appreciate that low-molecular-weight substances are generally 100% permeable to cell membranes, and high-molecular-weight substances are not. Fulvic acid is an example of such a low molecular weight substance. It has a very low-molecular-weight, is 100% absorbable in living cells, and is a part of the humic structure in composting soil. It is an acid created in extremely small amounts by the action of millions of beneficial microbes and carries 70 or more minerals and trace elements as part of its molecular complex in ideal natural form to be absorbed by plant roots and interact with living cells.

Fulvic acid can lower the surface tension of water, such that the water can penetrate organics. In addition, fulvic acid has been shown to increase the solubility of otherwise insoluble organic materials by a factor of about 20 times greater than water alone. Fulvic acids can also combine with higher molecular weight molecules and cause them to become water soluble, as well as chelate inorganics and increase their solubility and absorbability. A source of fulvic acid is F6000, available from Horizon Ag-Products, Modesto, Calif.

In some embodiments, the fulvic acid can be added to the water treatment composition in an amount ranging from about 0.1% to about 40%, from about 0.5% to about 35%, from about 1% to about 30%, from about 5% to about 25%, or any range therein, by weight. In many embodiments, the fulvic acid can be added in an amount ranging from about 5% to about 15% by weight.

In some embodiments, the additives can further comprise polyacrylamide. Polyacrylamide can be used in soil irrigation water to improve soil texture, is an ultra potent flocculant, reduces erosion and run-off that removes productive top soil and fills rivers and reservoirs. Polyacrylamide increases infiltration, yields, and irrigation of crops with a high residue.

While not intending to be bound by any theory or mechanism of action, the improved irrigation performance that results from the application of polyacrylamide appears to be a result of stabilized aggregates and improved pore continuity. In some embodiments, the polyacrylamides used in soil irrigation can include anionic polyacrylamide polymers. An example of a polyacrylamide is a linear polyacrylamide which can be obtained from Tramfloc, Inc. of Tempe, Ariz.

One of skill can determine the amount of polyacrylamide that is effective during irrigation in the compositions of the present invention. The amounts of polyacrylamide will vary according to the irrigations conditions. In some embodiments, the polyacrylamide can be added to the treated irrigation water in an amount ranging from about 1 ppm to about 20 ppm, from about 2 ppm to about 15 ppm, from about 5 ppm to about 10 ppm, or any range therein.

In some embodiments, the additives can include nitrogen, phosphorous, calcium nitrate, or a combination thereof. Other additives can be added to serve as insecticides, fungicides, and herbicides. In some embodiments, these herbicides, insecticides, and fungicides may be added to prevent crop damage from various weeds, insects, diseases, and other problems commonly faced by those of skill in the art.

The compositions of the present invention can include an alcohol. In some embodiments, the alcohol can include any alkanol and, particularly, any alkanol having from about 1 to about 12 carbons. In some embodiments, the alkanol can include ethanol, propanol, butanol, pentanol, hexanol, or isomers thereof. An example of an isomer of an alkanols is isopropanol, which is an isomer of propanol. It should be appreciated by one of skill that any one or any combination of suitable alcohols can be used in the present invention.

In some embodiments, the additives comprise from about 1% to about 10%, from about 2% to about 8%, from about 3% to about 7%, from about 3% to about 5%, or any range therein, in weight percent of an alkyl phenol ethoxylate. In some embodiments, the additives comprise from about 1 to about 10%, from about 2% to about 8%, from about 3% to about 7%, from about 3% to about 5%, or any range therein, in weight percent of a 2 to 5 carbon alkanol. In many embodiments, the alkyl phenol ethoxylate is octylphenoxy polyethoxyethanol, and the additives further comprise a mixture of sodium dodecylbenzene sulfonate, nonylphenol ethoxylate, and cocodiethanolamine.

The aqueous fluid can include any available source of water, or a treated water that has been combined with any additive taught herein for enhancing the performance of the treated irrigation water. The water can be from any common water source, such as rivers, lakes, and groundwater, and can include, for example, any potable water, some non-potable waters, and recycled water, such as the water from run-off.

It should be appreciated that the method should always use groundwater that is completely free of any likelihood of contamination by known carcinogenic or toxic substance discharges. Groundwater, for example, is usually classified into categories based first on whether the water is potable or non-potable, and then on the total of dissolved solids of the water. Aquifers, for example, are geographic formations that supply groundwater to wells, springs, or surface waters. Non-potable water is often located in confined aquifers. Unconfined groundwater is not necessarily potable as it is susceptible to contamination from another aquifer.

Figure 3:
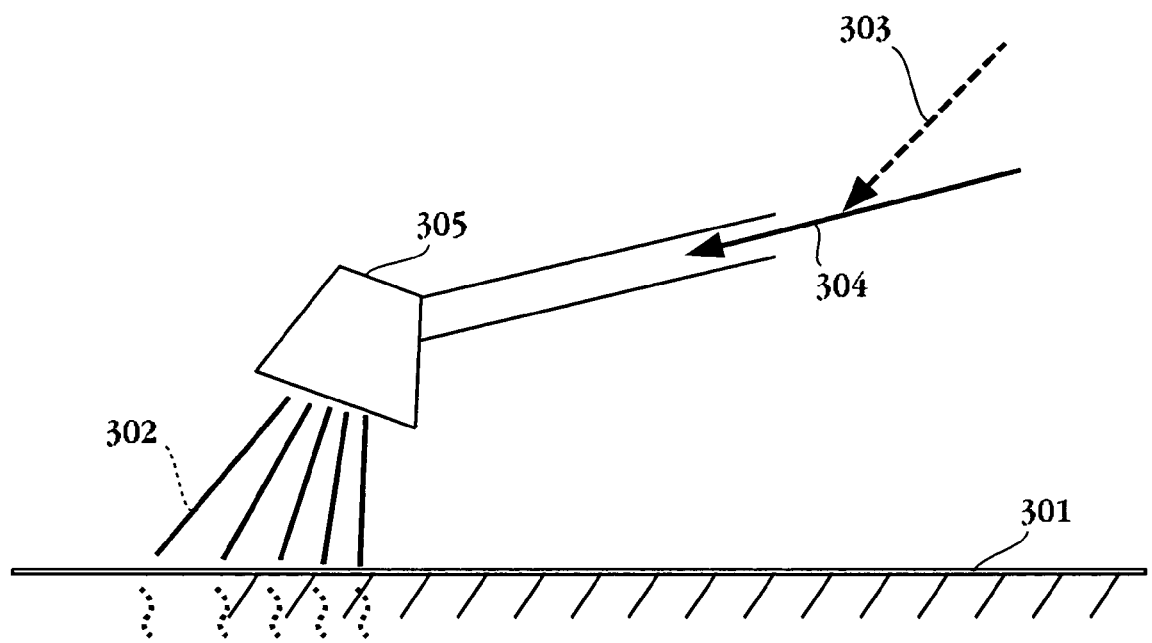
FIG. 3 illustrates a procedure used in irrigating soil according to some embodiments of the present invention.

FIG. 3 illustrates a procedure used in irrigating soil according to some embodiments of the present invention. Soil 301 is irrigated with a treated irrigation water 302 by adding water treatment composition 303 with aqueous fluid 304 and dispensing the treated irrigation water 302 through dispenser 305. In some embodiments, the aqueous fluid 304 is mixed with a water treatment composition 303 as a batch form. In some embodiments, water treatment composition 303 is added to the aqueous fluid during the process of irrigation.

The combining of additives with an aqueous fluid to create a treated irrigation water can occur during the applying of the treated irrigation water to the soil, wherein the improved penetration of the soil is obtained through a constant, or substantially constant, adding of the water treatment composition to the aqueous fluid during the irrigation. There are many methods of adding the additives to the aqueous fluid including chemical injection.

Chemical injection methods include centrifugal pumps, positive displacement pumps, pressure differential methods, and methods based on the venturi principle. In some embodiments, a combination of these methods is used. Any method of chemigation known to one of skill in the art can be used to combine the water treatment composition 303 with the aqueous fluid 304 to provide a constant, or substantially constant, treated irrigation water.

The chosen irrigation system can also have an effect on the amount of water treatment composition that should be added to the aqueous fluid. This is because different types of irrigation systems will apply the same amount of irrigation water to different soil surface areas. A system that applies the irrigation water to a smaller surface area, for example, may require more of the water treatment composition. This can be due to the occurrence of ponding from the greater amount of water applied per surface area. The additional water treatment composition may be required to obtain a greater reduction in the surface tension of the irrigation water, where the greater reduction in surface tension can allow for the desired water infiltration and, in some cases, avoid ponding. The converse is also true. Generally speaking, and at a fixed rate of irrigation, as the surface area increases, the amount of water treatment composition that is needed to obtain a desired water infiltration decreases.

One of skill will appreciate that the amount added is dependent on a variety of factors including, but not limited to, the chosen water treatment composition, the chosen irrigation system, and the area irrigated by the chosen system. The chosen water treatment composition, for example, may include a surfactant that has an effect on the surface tension of the aqueous fluid that is greater or lesser than another water treatment composition. If the effect on surface tension is greater, then less of the water treatment composition can be added, and the converse is also true. In fact, each additive in the water treatment composition can produce a different surface tension effect that will change the amount of water treatment composition that is needed.

In some embodiments, the water treatment composition can be added to the aqueous fluid in an amount ranging from about 1 ppm to about 30 ppm, from about 1 ppm to about 25 ppm, from about 2 ppm to about 20 ppm, from about 3 ppm to about 25 ppm, from about 5 ppm to about 15 ppm, from about 15 ppm to about 25 ppm, or any range therein. In some embodiments, the amount of water treatment composition added to an aqueous fluid for irrigation can range from about 0.00005% to about 0.003%, from about 0.0001% to about 0.002%, from about 0.0001% to about 0.001%, or any range therein, in weight percent.

In one example, the amount of water treatment composition added to a sprinkler or micro-sprinkler system can range from about 0.0001% to about 0.00075% by weight. In another example, the amount of water treatment composition added to a drip system can range from about 0.0002% to about 0.00075% by weight. In another example, the amount of water treatment composition added to a pivot system can range from about 0.0003% to about 0.00075% by weight. It is to be appreciated that the ranges taught herein are not limiting, and that the amounts used can vary substantially according to the factors described above.

Figure 4:
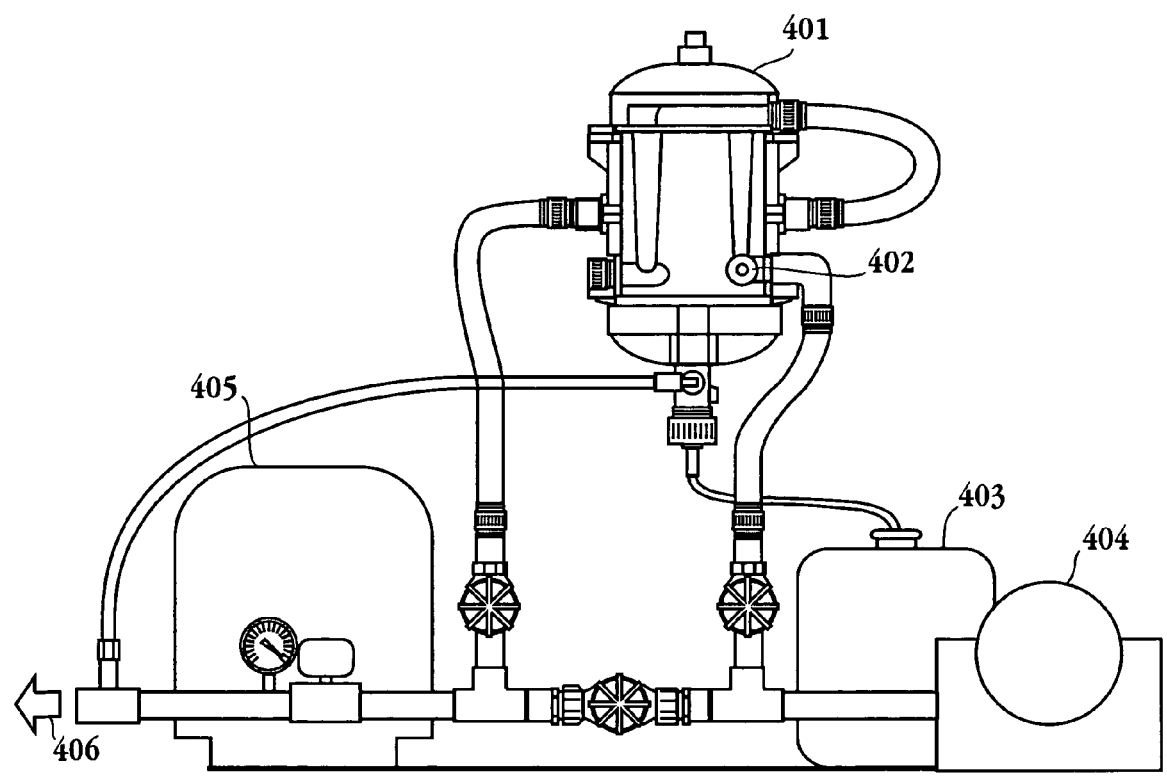
FIG. 4 illustrates a chemical injector apparatus that can be used to apply the water treatment compositions according to some embodiments of the present invention.

FIG. 4 illustrates a chemical injector apparatus that can be used to apply the water treatment compositions according to some embodiments of the present invention. The chemical injector 401 includes a needle valve 402 that is used to adjust the rate of injection of a water treatment composition into an aqueous fluid for the application of the treated irrigation water. The water treatment composition is held in a container 403, and the pressure used to apply the treated irrigation water is supplied by a combination of the pump 404 and the pressure tank 405. One of skill in the art should appreciate that this apparatus can be transported and used to apply a treated irrigation water 406.

In some embodiments, the present invention includes a system for irrigating a soil. The system can include a storage component for storing a water treatment composition, a feeding component for feeding the water treatment composition into an aqueous fluid, and a delivery component for applying the treated irrigation water to a soil. In one example, the storage component can be container 403 and the feeding component can be chemical injector 401. A means for chemically injecting the water treatment composition into the aqueous fluid includes any suitable chemical injector, such as an injector available from Chemilizer Products, Inc. of North, Largo, Fla.

In some embodiments, the injector is designed as a two-part mechanism comprised of a water motor and a chemical pump. The mechanism includes non-electric water motor—a fluid-powered motor—that functions on demand with water flow. A fixed diaphragm rather than a moving piston is used as the driving mechanism of the water motor. A positive displacement chemical pump is positioned in the bottom of the water motor, and the chemical pump draws directly from the storage container to inject the water treatment composition into the aqueous fluid. In some embodiments, the injector is designed as a three part mechanism comprised of a water motor, a flow meter and a chemical pump.

As described above, the present invention provides a substantial improvement over existing irrigation compositions, methods, and systems. Accordingly, the invention includes methods of improving soil and enhancing the quality and shelf-life of agricultural products grown using the methods and compositions of the present invention. The manner in which a soil can be improved has been described above. Product quality can be improved, in some embodiments, through a reduction in product failure. The improvements described herein all provide agricultural products such as, for example, carrots, bell peppers, grapes, etc., with an enhanced nutrient availability. Such enhanced nutrient availability provides for healthier and stronger tissue in the products, which translates to a better product with a longer shelf-life. A measure of the improved quality and shelf-life is that the cell wall and cell membrane development of the product grown using the methods taught herein can be compared to those of the same product that was grown using an untreated irrigation water.

EXAMPLES

Example 1

Water Treatment Composition with Surfactant and Displacement Ion

A water treatment composition was prepared by combining 6% OP-10 with 13% ESCALEIGHT, and the balance water, where the concentrations are based on a weight percent of the total weight of the water treatment composition.

The composition should be added to irrigation water at a concentration ranging from about 0.0001% to about 0.003%, depending on the irrigation system employed. The treated irrigation water was applied to soil and a very significant increase in the penetration rate of the soil was realized where the treated irrigation water was applied throughout the entire duration of the irrigation.

Example 2

Water Treatment Composition with Surfactant, CAN 17, and Fulvic Acid

A water treatment composition was prepared by combining 17.8% OP-10, 30% F6000, 24% CAN 17, and the balance water, where the concentrations are based on a weight percent of the total weight of the water treatment composition.

In addition to reducing the amount of water used in the composition, thus increasing the amount of active components, the composition provides for the benefits associated with the addition of fulvic acid, and the ESCALEIGHT used in Example 1 was replaced with CAN 17. The composition should be added to irrigation water at a concentration ranging from about 0.0001% to about 0.003% by weight, depending on the irrigation system employed. The treated irrigation water was applied to soil and a very significant increase in the penetration rate of the soil was realized where the treated irrigation water was applied throughout the entire duration of the irrigation.

Example 3

Water Treatment Composition with Surfactant, Fulvic Acid, and CAN 17

A water treatment composition was prepared by combining 5.7% OP-10 with 10% F6000, 12% CAN 17, and the balance water, where the concentrations are based on a weight percent of the total weight of the water treatment composition.

The amount of active components was decreased, and thus the amount of water added was increased. The composition should be added to irrigation water at a concentration ranging from about 0.0001% to about 0.003% by weight, depending on the irrigation system employed. The treated irrigation water was applied to soil and a very significant increase in the penetration rate of the soil was again realized, where the treated irrigation water was applied throughout the entire duration of the irrigation.

Example 4

Water Treatment Composition with Surfactant, Alcohol, Fulvic Acid, and CAN 17

A water treatment composition was prepared by combining 5.7% OP-10 with 4.2% isopropanol, 10% F6000, 24% CAN 17, and the balance water, where the concentrations are based on a weight percent of the total weight of the water treatment composition.

Alcohol can be added for a variety of reasons, which includes serving as a blending agent by enhancing the ability to solubilize the OP-10. This composition also doubles the concentration of the CAN 17 used in Example 3. The composition should be added to irrigation water at a concentration ranging from about 0.0001% to about 0.003% by weight, depending on the irrigation system employed. The treated irrigation water was applied to soil and a very significant increase in the penetration rate of the soil was again realized, where the treated irrigation water was applied throughout the entire duration of the irrigation.

Example 5

Water Treatment Composition with a Combination of Surfactants (Ionic and Non-Ionic), Alcohol, Fulvic Acid, and CAN 17

A water treatment composition that is essentially the same as the composition of Example 4 can be prepared to include a combination of an ionic surfactant and a non-ionic surfactant. In some embodiments, the composition should be added to irrigation water at a concentration ranging from about 0.0001% to about 0.003% by weight, depending on the irrigation system employed. The treated irrigation water can be applied to a soil and a very significant increase in the penetration rate of the soil should be realized, where the treated irrigation water is applied throughout the entire duration of the irrigation.

While particular embodiments of the present invention have been shown and described, those skilled in the art will note that variations and modifications can be made to the present invention without departing from the spirit and scope of the teachings. One of skill will appreciate that the teachings have been provided by way of example only and are not intended to limit the scope of the invention. One of skill will appreciate that the amounts of the components used in the treated irrigation water can be varied extensively without undue experimentation, since the performance obtained from the variations can be easily measured using, for example, contact angle measurements or soil penetration measurements.

I claim:

1. A method of irrigating soil comprising:
combining additives with an aqueous fluid to create a treated irrigation water, wherein the additives comprise a preselected amount of a non-ionic surfactant in an amount as low as about 0.0000057% by weight and a preselected amount of a displacement ion in an amount ranging from about 0.00002% to about 0.03% of the displacement ion by weight in addition to the amount of any other displacement ion present in the aqueous fluid before the combining;
and,
applying the treated irrigation water to a soil for an improved penetration of water into the soil during the irrigation, wherein the improved penetration is obtained through a constant, or substantially constant, application of the treated irrigation water to the soil during the irrigation; and, wherein,
the penetration of water into the soil during irrigation is improved over processes that do not apply (i) the non-ionic surfactant in an amount as low as about 0.0000057% by weight and (ii) the displacement ion in an amount ranging from about 0.00002% to about 0.03% by weight using the constant, or substantially constant, application; and,
the application is substantially constant when a brief interlude in the applying of the treated irrigation water does not significantly affect the improved penetration of the water into the soil.

2. The method of claim 1, wherein the non-ionic surfactant comprises an alkyl phenol ethoxylate.

3. The method of claim 1, wherein the non-ionic surfactant comprises a component selected from a group consisting of octylphenoxy polyethoxyethanol; a mixture of poly(ethylene glycol) octylphenyl ether, poly(ethylene glycol), dioxane, and ethylene oxide; or a combination thereof.

4. The method of claim 1, wherein the displacement ion comprises a component selected from a group consisting of calcium, potassium, phosphate, and combinations thereof.

5. The method of claim 1, wherein the treated irrigation water further comprises fulvic acid, polyacrylamide, or a combination thereof.

6. The method of claim 1, wherein the treated irrigation water comprises:
from 0.0000057% to about 0.001% by weight of the non-ionic surfactant; and
from 0.00005% to about 0.01% by weight of the displacement ion in addition to any other displacement ion present in the aqueous fluid before the combining.

7. The method of claim 1, wherein the combining comprises:
producing a water treatment composition that comprises the non-ionic surfactant and the displacement ion; and
adding the water treatment composition to the aqueous fluid in an amount sufficient for the improved penetration of water into the soil during the irrigation.

8. The method of claim 7, wherein the adding comprises:
introducing the water treatment composition to the aqueous fluid while applying the treated irrigation water to the soil, wherein the improved penetration is obtained through a constant, or substantially constant, adding of the water treatment composition to the aqueous fluid during the irrigation.

9. The method of claim 7, wherein the non-ionic surfactant comprises an alkyl phenol ethoxylate.

10. The method of claim 7, wherein the non-ionic surfactant comprises a component selected from a group consisting of octylphenoxy polyethoxyethanol; a mixture of poly(ethylene glycol) octylphenyl ether, poly(ethylene glycol), dioxane, and ethylene oxide; or a combination thereof.

11. The method of claim 7, wherein the non-ionic surfactant is combined with a second surfactant, wherein the combination of surfactants is substantially non-ionic.

12. The method of claim 7, wherein the displacement ion comprises a component selected from a group consisting of calcium, potassium, phosphate, and combinations thereof.

13. The method of claim 7, wherein the water treatment composition comprises fulvic acid.

14. The method of claim 7, wherein the water treatment composition comprises polyacrylamide.

15. The method of claim 7, wherein the water treatment composition comprises:
from about 1% to about 20% by weight of the non-ionic surfactant; and
from about 0.2% to about 10% by weight of the displacement ion.

16. The method of claim 7, wherein the water treatment composition further comprises an alcohol, wherein the alcohol comprises an alkanol having from about 1 to about 12 carbons.

17. A method of improving the quality and shelf-life of an agricultural product, wherein the method comprises using the method of irrigating soil of claim 7, wherein the cell wall and cell membrane development of the product grown using the method of irrigating soil of claim 7 is an improvement over the same product that was grown using an untreated irrigation water.

* * * * *